(12) United States Patent
Revanuru

(10) Patent No.: US 8,019,945 B2
(45) Date of Patent: Sep. 13, 2011

(54) SYSTEM AND METHOD FOR TRANSACTIONAL CACHE

(75) Inventor: Naresh Revanuru, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 325 days.

(21) Appl. No.: 12/363,648

(22) Filed: Jan. 30, 2009

(65) Prior Publication Data

US 2009/0198899 A1 Aug. 6, 2009

Related U.S. Application Data

(60) Provisional application No. 61/025,176, filed on Jan. 31, 2008, provisional application No. 61/025,165, filed on Jan. 31, 2008, provisional application No. 61/025,171, filed on Jan. 31, 2008, provisional application No. 61/025,185, filed on Jan. 31, 2008.

(51) Int. Cl.
*G06F 12/08* (2006.01)
(52) U.S. Cl. ............... 711/118; 711/128; 711/E12.017
(58) Field of Classification Search .................. None
See application file for complete search history.

(56) References Cited

U.S. PATENT DOCUMENTS

| | | | |
|---|---|---|---|
| 5,136,700 A | 8/1992 | Thacker | |
| 5,226,144 A | 7/1993 | Moriwaki | |
| 5,615,362 A | 3/1997 | Jensen | |
| 5,717,919 A | 2/1998 | Kodavalla et al. | |
| 5,933,849 A | 8/1999 | Srbljic | |
| 5,951,695 A | 9/1999 | Kolovson | |
| 6,026,413 A | 2/2000 | Challenger | |
| 6,128,623 A | 10/2000 | Mattis | |
| 6,587,937 B1 | 7/2003 | Jensen | |
| 6,633,862 B2 | 10/2003 | Thompson | |
| 6,704,735 B1 | 3/2004 | Salo et al. | |
| 6,813,690 B1 | 11/2004 | Lango | |
| 6,839,816 B2 | 1/2005 | Borkenhagen | |

(Continued)

FOREIGN PATENT DOCUMENTS

EP 1677198 7/2006

(Continued)

OTHER PUBLICATIONS

JBoss Cache TreeCache—A Structured, Replicated, Transactional Cache User Documentation, http://docs.jboss.org/jbosscache/1.4.0/TreeCache/en/html_single/index.html#d0e560, Jul. 2006.*

(Continued)

*Primary Examiner* — Kevin Verbrugge
(74) *Attorney, Agent, or Firm* — Fliesler Meyer LLP

(57) ABSTRACT

A computer-implemented method and system to support transactional caching service comprises configuring a transactional cache that are associated with one or more transactions and one or more work spaces; maintaining an internal mapping between the one or more transactions and the one or more work spaces in a transactional decorator; getting a transaction with one or more operations; using the internal mapping in the transactional decorator to find a work space for the transaction; and applying the one or more operations of the transaction to the workspace associated with the transaction.

15 Claims, 10 Drawing Sheets

U.S. PATENT DOCUMENTS

| | | |
|---|---|---|
| 7,003,776 B2 | 2/2006 | Sutherland |
| 7,418,560 B2 | 8/2008 | Wintergerst |
| 7,421,542 B2 | 9/2008 | Graham |
| 7,428,617 B2 | 9/2008 | Okawa et al. |
| 7,434,002 B1 | 10/2008 | Zedlewski |
| 2004/0148283 A1 | 7/2004 | Harris et al. |
| 2005/0027945 A1 | 2/2005 | Desai |
| 2005/0223005 A1 | 10/2005 | Shultz |
| 2006/0064545 A1 | 3/2006 | Wintergerst |
| 2006/0085591 A1 | 4/2006 | Kumar |
| 2006/0248276 A1 | 11/2006 | Kilian et al. |
| 2006/0294300 A1 | 12/2006 | Lubbers |
| 2007/0198781 A1 | 8/2007 | Dice et al. |

FOREIGN PATENT DOCUMENTS

| | | |
|---|---|---|
| WO | WO 0205134 | 1/2002 |
| WO | WO2008080525 | 7/2008 |

OTHER PUBLICATIONS

Wang, et al. "Organization and Performance of a Two-Level Virtual-Real Cache Hierarchy", 1989 ACM, 9 pages.

Nenov, et al., "Memory Sensitive Caching in Java", International Conference on Computer Science Systems and Technologies—CompSysTech 2005, 6 pages.

International Search Report for PCT/US2009/032742, dated Apr. 21, 2009, 12 pages.

\* cited by examiner

SYSTEM AND METHOD FOR TRANSACTIONAL CACHE

CLAIM OF PRIORITY

This application claims the benefit of priority to U.S. Provisional Patent Application No. 61/025,176, filed Jan. 31, 2008, entitled SYSTEM AND METHOD FOR TRANSACTIONAL CACHE; U.S. Provisional Patent Application No. 61/025,165, filed Jan. 31, 2008, entitled SYSTEM AND METHOD FOR DISTRIBUTED CACHE; U.S. Patent Application No. 61/025,171, filed Jan. 31, 2008, entitled SYSTEM AND METHOD FOR TIERED CACHE; U.S. Patent Application No. 61/025,185, filed Jan. 31, 2008, entitled SYSTEM AND METHOD FOR MUTABLE OBJECT HANDLING, each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to the field of caching service, and particularly relates to distributed caching.

BACKGROUND

Caching refers to the temporary storage of a copy of a record to achieve higher performance in software systems. A cache is made up of a pool of entries. Each entry has a datum (a nugget of data) which is a copy of the datum in some backing store. Each entry also has a tag, which specifies the identity of the datum in the backing store of which the entry is a copy. When the cache client (a CPU, web browser, operating system) wishes to access a datum presumably in the backing store, it first checks the cache. If an entry can be found with a tag matching that of the desired datum, the datum in the entry is used instead. This situation is known as a cache hit. So, for example, a web browser program might check its local cache on disk to see if it has a local copy of the contents of a web page at a particular URL. In this example, the URL is the tag, and the content of the web page is the datum. The percentage of accesses that result in cache hits is known as the hit rate or hit ratio of the cache. The alternative situation, when the cache is consulted and found not to contain a datum with the desired tag, is known as a cache miss. The datum fetched from the backing store during miss handling is usually inserted into the cache, ready for the next access.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Caching refers to the temporary storage of a copy of record to achieve higher performance in software systems. The performance gain can be achieved by reducing the number of accesses to the original record of data, which might involve database access or compute intensive operations in creating the original record or it can be other sources of information which are expensive (in terms of resources) to access. Performance gains can be also achieved by sharing such cached objects across threads in a process, processes, and potentially across processes spread over multiple machines. Coupled with this is the provision of various caching features—enhancing the cache access features such as transactions, partitioned caches and availability features such as replication.

One embodiment of the present invention is a caching system for static and dynamic Java objects that can be deployed and used in a Java application. While the caching system can be integrated with the features present in a J2EE container such as, the present invention does not mandate the presence of a J2EE container for use of the Java caching system.

In accordance with one embodiment, a cache is a named container of the cached objects. A cache system or cache space has one or more such containers. Caches can override some of the attributes from the cache system. In one example, caches primarily present a java.util.Map interface to the user.

Objects are placed in a cache either explicitly (cache aside caches) or implicitly on accessing the key associated with the cache (cache-through caches). In some cases, cached objects can be identified by a specific key.

Cache Key is the key by which a cached object is referenced within the cache containers. Keys are Java objects that override hashCode( ) and equals( ) methods defined on an object. They are also serializable and comparable interfaces for supporting queries and persistence. Objects of type java.lang.String are typically used.

In accordance with one embodiment, the cache key is serializable for non-local cached objects. The key's class can override the hashCode( ) and equals( ) methods of the java.lang.Object class. Primitive types can also be used as cache keys.

Figure 1:
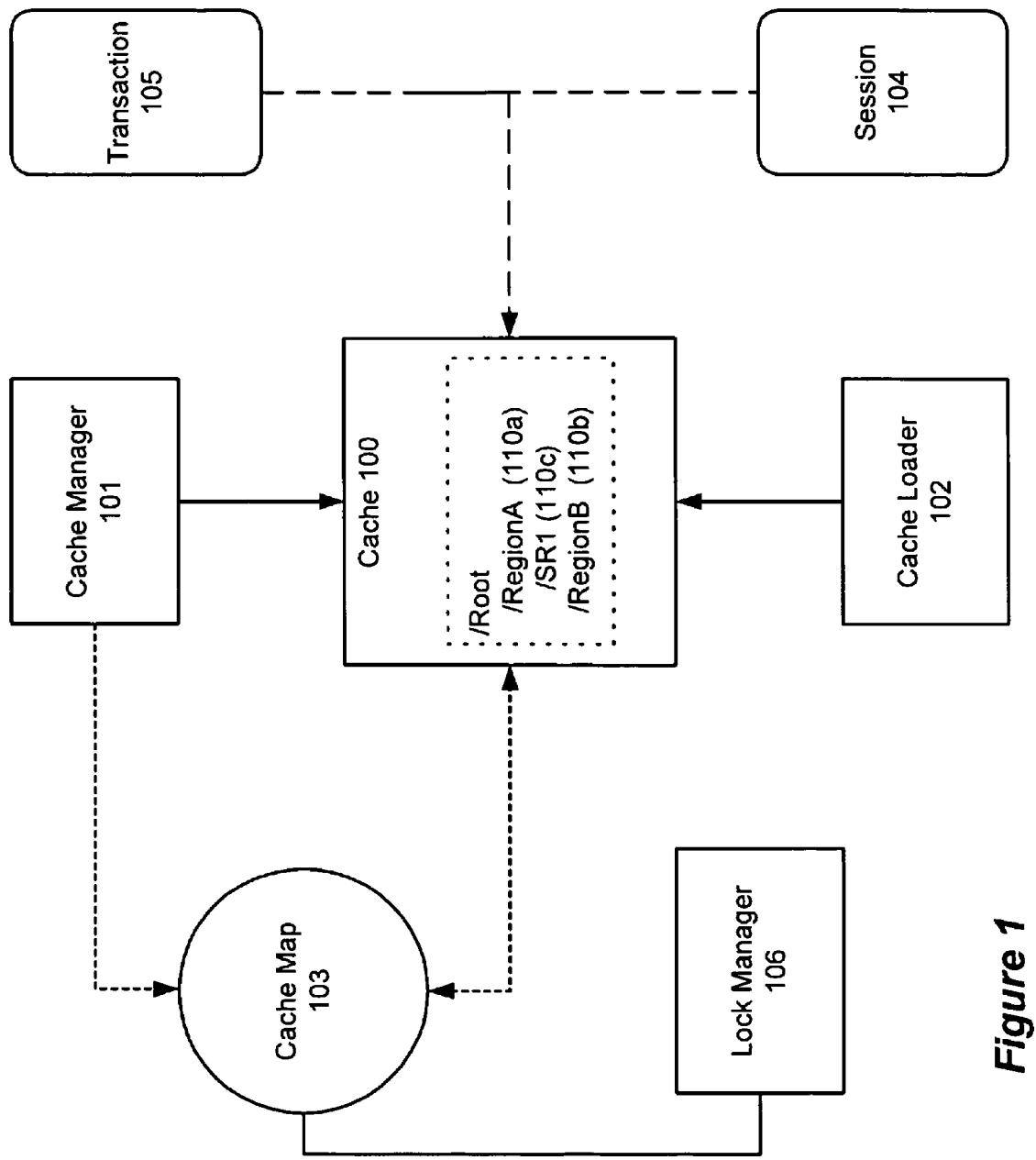
FIG. 1 is an exemplary illustration of a cache system in accordance with one embodiment of the present invention.

FIG. 1 is an exemplary illustration of a cache system in accordance with one embodiment of the present invention.

In accordance with one embodiment, a region 110a or 110b is a container within a cache. It can provide for hierarchical object storage in a cache 100. Regions 110a and 110b can override some of the cache attributes (like scope). A region 110a can have sub regions or cached objects 110c.

In accordance with one embodiment, to enable complex event processing, a set of cached objects can be grouped. Grouping allows certain cache actions, such as cache invalidation, to be automatically performed on related objects. Cache Invalidation is the act of invalidating a cache object because of updates to the cached object or removal of a cached object from a cache.

For example, invalidation of a group object invalidates all the objects dependent on the object being invalidated. Similarly, in cache-through caches, groups are used to fault-in all the dependent cache objects if an object being cached has additional dependencies not yet present. In another example, a group object is restricted to have dependencies only within the container cache object.

In accordance with one embodiment, domain independent cache configuration is applied. In one example, a domain independent cache configuration is a domain independent way of configuring clustering for distributed caches. In addition, it is also useful to have a domain wide distributed cache that may not restrict distributed caches to a cluster. The cache service can also utilize different security measures. As a step to enabling security for cache, it can be useful to modify APIs to restrict access to caches based on roles. One embodiment of the present invention can leverage the cache implementation in OpenJPA.

In accordance with one embodiment, Cache Manager 101 is the controller of the caching service. The caching service can be described by a persistent configuration, with dynamic management and administration facilities. On initialization, the Cache Manager 101 creates the configured caches and initializes them. The lifecycle services provided by the Cache Manager can be similar to the Server Services in an application server, but they are defined independently to avoid dependencies on such an application server.

The Cache Manager 101 provides Configuration, Management, Administration and Performance Monitoring services. Cache Manager 101 can also provide support for auxiliary services like licensing and cache sessions. Another important aspect of Cache Manager 101 is capacity management and enforcement of various standard attributes for the caching service as a whole.

In accordance with one embodiment, sessions can provide view management and isolation. In one example, updates to cache objects done within a session 104 are not propagated until the session is ended. The session 104 can also be abortively ended, meaning that none of the updates done within the session context are made visible to other users of the cache. Sessions 104 can essentially provide batching of cache updates.

Apart from session support, the cache service provides transaction support for managing the objects in the cache. Cache transactions can be controlled manually through methods exposed by transactional caches or automatically through the Java Transaction API (JTA). In one example, changes made within a transaction 105 are fully isolated according to the configured isolation level. Commits can be atomic, consistent, and durable. Rollback can be fully supported and may not impact the integrity of the cache.

In accordance with one embodiment, Cache Map 103 is the primary interface of the cache. As an example, cache map 103 is a map based interface. Additional functionality like monitoring and store awareness can be added to a cache map 103.

In one example, cache can be just a java.util.Map as far as the user is concerned. The Map derives its properties from the configuration. For example if the Map is configured to be replicated then all updates to the Map are propagated to other nodes in the cluster. All map operations can be supported. A typical use of the Cache is shown below:

Listing-1: Typical CacheMap usage

```
Map myCache = CacheManager.getCache("mycache");
myCache.put(mySerializableKey, mySerializableValue);
java.io.Serializable value = (Serializable)
myCache.get(mySerializableKey);
// modify value
myCache.put(mySerializableKey, value);
```

In some examples, local caches do not require serializable keys or values. Other forms like the replicated and partitioned caches require serializable cache entries. In one example, users of Cache API can get the Cache instance by using the following operation provided by Cache Manager:

Listing-2: CacheMap lookup

```
CacheMap getCache(String name);
```

In another example, a cache can be created through the Cache Manager 101. In one example, the Cache Manager 101 has the following factory method:

Listing-3: Cache creation

```
// Creates a cache with the given name and provided properties
CacheMap createCache(String name, Map properties);
```

This method allows the customers to pass in a set of name-value pairs and construct a cache instance out of it.

In accordance with one embodiment, there are two interfaces for cache management. CacheFactory can be used to create new caches in the system. CacheManager can be useful for looking up caches in the system. Cache and CacheEntry are the two main artifacts of JCache. They extend the Map & Map.Entry interfaces to provide extra caching relevant APIs.

In accordance with one embodiment, the APIs can be extended to provide enhanced functionality. For example, extra APIs can be added to Cache to help users get statistics about the cache, change behavior and listen to changes. In one embodiment of the present invention, CacheStatistics provides various statistics for a cache instance. In addition, users can use implementations of CacheListener interface to listen for changes to the cache. Users can also plug-in implementations of CacheLoader to specify how cache entries are loaded if a key being looked up is not found in the cache. Users can also specify custom EvictionStrategy to define how cache entries are dropped from the cache. Furthermore, CacheException can be used to indicate problems and exceptional conditions in the use of cache.

In accordance with one embodiment, Cache map 103 is an instance of a Map. Apart from the basic CRUD operations supported through the Map interface, the following operations are available to a cache map user.
 (1) Put if absent
 (2) Remove
 (3) Replace
 (4) Loading a collection of keys into the cache In accordance with one embodiment, Cache Map 103 provides additional operations to retrieve monitoring data including the following:
 (1) Cache hits & misses
 (2) Element count in memory
 (3) Clear the statistics and start monitoring afresh
 (4) Check if a key is being currently loaded by cache loader In accordance with one embodiment, monitoring information can be exposed at the individual cache entry level as well. However, this information may not need to be shared across cache instances across Java Virtual Machines (JVMs). For example, the cache entry level statistics that are available are:
 (1) Creation time
 (2) Expiration time
 (3) Number of hits
 (4) Last accessed time
 (5) Last updated time
 (6) Current state (valid or expired).

In accordance with one embodiment, Cache map 103 also exposes the following management operations:
 (1) Evict expired elements immediately
 (2) Flush all cache entries to persistent store
 (3) Bootstrap/initialize the cache before beginning operations
 (4) Shutdown the local instance of the cache thereby clearing elements from memory to persistent store.
 (5) Forcibly shutdown all instances of the cache. The effect of this operation is same as regular shutdown for local caches. For distributed caches, this also shuts down remote instances of the cache.
 (6) Ability to lock/unlock a key in the given cache. Locking a key in the cache will give exclusive access to the cache entry across partitions if the cache is distributed. Lock operation will take a timeout parameter that will specify the time period to wait for the lock to be acquired.
 (7) Ability to register and unregistered event listeners In accordance with one embodiment, Cache Manager 101 is a factory and registry of caches. The cache manager 101 can also support the following cache management operations:
 (1) Lookup: Returns a cache given the cache name
 (2) List: Gets a list of all created caches
 (3) Startup: Creates caches using the configuration file
 (4) Shutdown: Shuts down all caches in the local JVM.
 (5) Force Shutdown: Forcefully shuts down all cache instances in the local JVM. Also, shuts down instances on other JVM's.
 (6) Cache Lifecycle Listeners: Attach cache creation and shutdown listeners
 (7) Cache Event Listeners: Attach listeners to all registered and yet-to-be-created caches.

In accordance with one embodiment, a cache manager instance is created and made available for managed environments such as WebLogic Server (WLS). However, in another embodiment for unmanaged environments, a cache manager is created using cache manager factory. This factory is a stateless JVM singleton that is used to create a cache manager.

---
Listing-4: CacheManager creation

CacheManager manager =
 CacheManagerFactory.getInstance( ).createCacheManager( );
---

In accordance with one embodiment, Customers implements EventListener interface to get cache change notifications. It is important to note that event listeners need to be collocated with the Cache. Cache Event listeners may not be registered remotely.

In accordance with one embodiment of the present invention, a change event is generated when the underlying cache has changed. An event listener can be applied to the following events.
 (1) Put
 (2) Update
 (3) Delete
 (4) Paged an entry to temporary store
 (5) Loaded an key from the backing store
 (6) Stored an entry to the backing store In accordance with one embodiment, this event returns a set of cache values that have changed. Each element in the set can contain the following information:
 (1) Reference to the cache
 (2) Key
 (3) Time of change
 (4) Type of update In accordance with one embodiment, cache values may not be returned in change event. This can be done to improve performance and conserve data transfer bandwidth.

---
Listing-5: Listener registration

CacheMap cache = CacheManager.getCache("mycache");
cache.addListener(EventListener.PUT | EventListener.UPDATE,
 myListener);
...
cache.removeListener(myListener);
---

In accordance with one embodiment, Asynchronous Event Listener is implemented for certain systems that require dealing with event listeners asynchronously. A utility class called the asynchronous listener is provided for such cases. This event listener can be a decorator that is used to wrap any customer event listener.

Cache Loader 102 is an external source of information that can be used to populate the caches, either on startup or on cache miss faults.

In accordance with one embodiment, Cache loader 102 is a user defined class that implements the CacheLoader interface. If configured, the cache loader 102 is invoked to load a cache entry when there is a cache miss. In one example, Cache loaders 102 can only be configured at cache creation time.

In accordance with one embodiment, the Cache loader 102 does not make any assumption on the invoking thread. It can be called from the users thread or it can be called asynchronously. The Cache loader 102 implements the following methods:
 (1) Load value, given a key
 (2) Load values, given a collection of keys In accordance with one embodiment, there are different ways in which cache loaders are invoked in self-loading caches:

(1) Read Through: In a read through self-loading cache, the loader is invoked when the first request for the key is made. The request blocks while the loader tries to get the entry from the backing store. In the meantime, if other threads make a request for the same key, they can get blocked too.

(2) Read Behind: If a key does not exist in a read-behind cache, a call to Map.get( ) immediately returns null. In a separate thread, the cache loader is invoked and it tries to load the value. In the meantime, if other threads try to call Map.get( ) for the same key, they can get a null value too. However, in these cases, no new cache load thread is spawned. This is accomplished by maintaining an internal list of keys being loaded. This list may be queried using the monitoring APIs of the cache map.

In accordance with one embodiment, Cache store is a user defined class that implements the CacheStore interface. In one example, a cache store is only configured at creation time. The user defined class is used to persist changes whenever a cache value is updated. In one example, the cache store does not make any assumption on which thread is calling it. It is called from the users thread or it can be called asynchronously. The cache store implements the following methods:

(1) Store a key value pair
(2) Store a map of key value pairs
(3) Remove a key from the store
(4) Remove a collection of keys form the store In accordance with one embodiment, write policies are defined. There are three different ways in which dirty entries can be written to the backing store.

(1) Write Through: The write through policy indicates that the entry is synchronously written to the backing store.
(2) Write Behind: In a write behind scenario, the updated entry is asynchronously written to the backing store.
(3) Write Back: With a write back writing policy, the dirty entry is not updated in the backing store until it is evicted from the cache.

In accordance with one embodiment, the write operations to the backing store are batched when cache sessions are used.

On the other hand, eviction policy deals with three issues:
(1) When to evict an entry from the Cache?
(2) Which entries to pick for eviction?
(3) Where to evict?

When to evict an entry can be determined by the size of the Cache. Customers set a limit on the number of in-memory entries in the Cache. Once the limit is reached, eviction occurs. Two limits can be set by the user:
(1) Limit on the number of in-memory entries
(2) Limit on the total number of entries—both in-memory and those persisted to disk The entries to evict can be based on one of the following algorithms:
(1) Least Recently Used (LRU)
(2) Least Frequently Used (LFU)
(3) First-in First-out (FIFO)
(4) Not-recently-used (NRU)
(5) Random Eviction Strategy
(6) Custom eviction algorithm—in one example, an interface can be exposed for custom eviction. Customers can implement the following method:
  1. Given the map, return an ordered list of key. The order governs the order of eviction.

Where to evict can be determined by one of the two policies:
(1) Lose it—evicted entries are lost
(2) Paging to secondary cache.

In accordance with one embodiment, users can hold a lock on one or more cache entries. The Cache Map 103 can have a provision to obtain a Lock Manager 106 on which locking and unlocking operations are performed. In the case of a distributed cache, the lock can be cluster wide. All locks are obtained with a timeout value. The locks are acquired and released in different threads if an owner is provided. The lock manager 106 provides support for both shared and exclusive locks. In one example, the lock manager 106 allows the demotion from exclusive lock to shared lock for an owner.

In accordance with one embodiment, a lock owner is a transaction in case of replicated caches and it can be the current thread in case of local caches. In addition, lock owner is a serializable object if the map is replicated. Locking a key which does not exist in the Cache Map can reserve the key for the client. This prevents other clients from creating entries with the same key. A client can lock the entire map for exclusive access. This blocks other clients from performing any operations on the map. Furthermore, clients can hold locks for a given configured period of time. The locks are forcefully freed by the lock manager 106 and given to other waiters once the hold time has elapsed Table-1 describes various scenario when different types of locks are acquired and requested.

TABLE 1

|  | Shared lock requested | Exclusive lock requested |
| --- | --- | --- |
| Shared lock acquired | Yes (to all owners) | No (to all owners) |
| Exclusive lock acquired | Yes (if the owner is the same) No (if the owner is different) | No |

In accordance with one embodiment, two main operations provided are:
(1) tryLocks(Set<K> keys, Object owner, RWLock.Mode mode, long timeout)—acquires locks on the given set of keys with the provided owner and mode (shared or exclusive) with a timeout.
(2) releaseLocks(Set<K> keys, Object owner, RWLock.Mode mode)—releases locks on the given set of keys with the provided owner and mode(shared or exclusive)

In accordance with one embodiment, the LockManager 106 supports other convenience operations as:
(1) tryExclusiveLocks(Set<K> keys)—acquire exclusive locks for the set of keys with no timeout with current thread as the owner
(2) trySharedLocks(Set<K> keys)—acquire shared locks for the set of keys with no timeout with current thread as the owner
(3) releaseExclusiveLocks(Set<K> keys)—release exclusive locks for the set of keys with current thread as the owner
(4) releaseSharedLocks(Set<K> keys)—release shared locks for the set of keys with current thread as the owner Listing-6 shows an example on how to lock a cache entry:

---
Listing-6: Locking an entry
---

```
LockManager lockManager = cacheMap.getLockManager( );
if (lockManager != null) {
  // this map supports locking support
  if (lockManager.tryExclusiveLocks(keySubSet)) {
    try {
      // do some operations here. The current thread is the owner
      // of the locks
```

-continued

Listing-6: Locking an entry

```
    } finally {
        // release all the locks
        lockManager.releaseExclusiveLocks(keySubSet))
        }
    }
}
```

In accordance with one embodiment, a session 104 is a map based interface to batch up operations on a cache. Sessions can be used both in a transactional and non-transactional setting. The main advantage of using sessions in a non-transactional setup can be to batch up update operations when a backing store is involved. This can also be useful in reducing the network traffic in replicated/partitioned caches.

Listing-7: Cache session usage

```
CacheMap cache = CacheManager.getCache("mycache");
CacheMap session = CacheManager.createSession(cache);
// Could have alternatively used
// CacheMap session = CacheManager.createSession("mycache");
// perform a series up update operations on the session map
session.put(mykey, myvalue);
...
session.flush( );
...
session.put(mykey1, myvalue1);
...
session.flush( );
// stop using session when done
```

In accordance with one embodiment, different types of paging are supported:
(1) Paging to persistent store such as a persistent store—Fast access to local disk
(2) File Store.

In accordance with one embodiment of the present invention, for each of the two temporary stores mentioned above, an adapter cache map is made available as a utility class.

Figure 2:
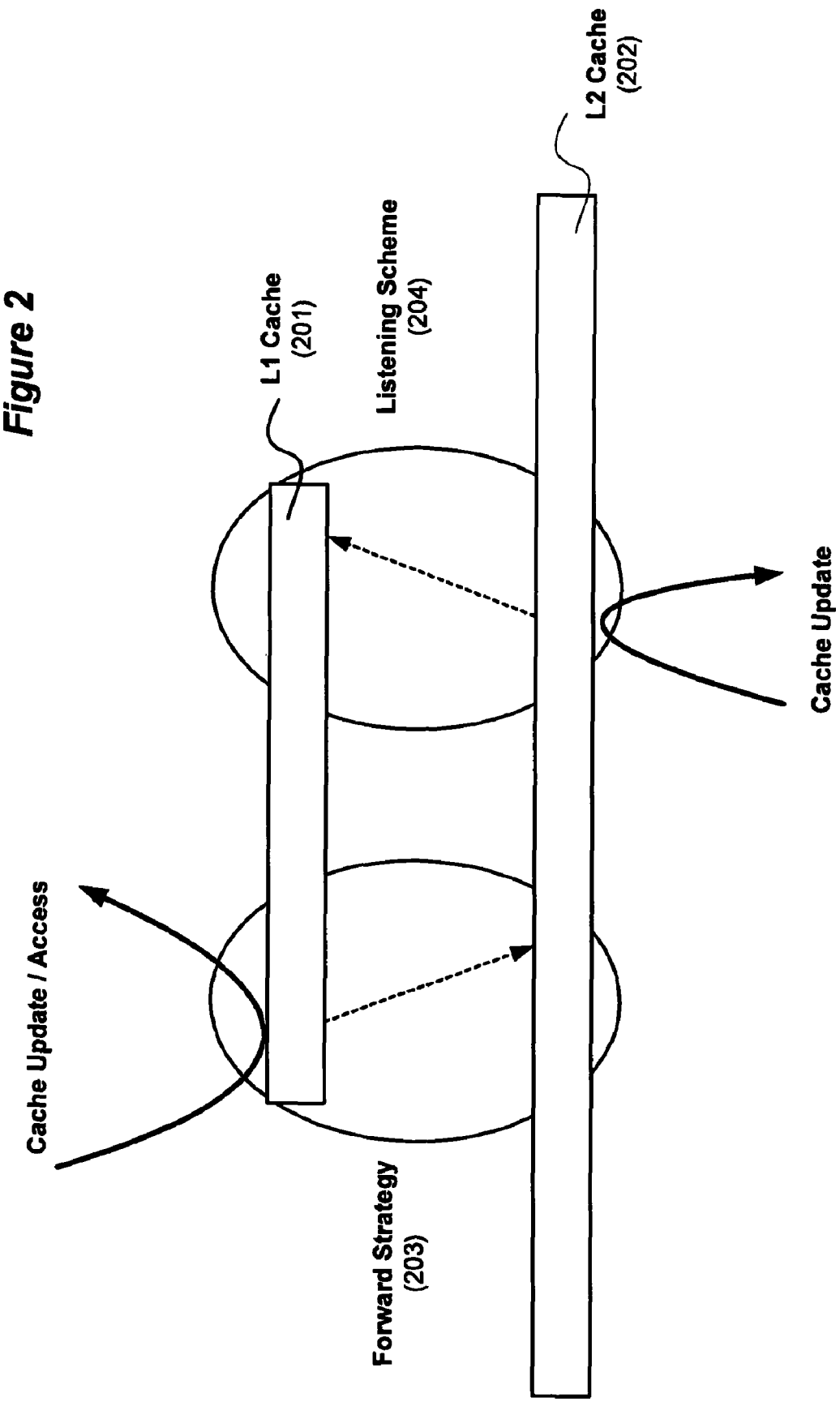
FIG. 2 is an exemplary illustration of a tiered cache in accordance with one embodiment of the invention.

In accordance with one embodiment of the present invention, pinning a key is a way to override eviction strategies and provides better control to the application programmers. The following APIs can be desirable on Cache Map interface to provide better control to application programmer.
(1) Pin a key
(2) Pin a collection of keys
(3) Unpin a key
(4) Unpin a collection of keys Tiered Cache FIG. 2 is an exemplary illustration of a tiered cache in accordance with one embodiment of the invention. Tiered cache is a utility class that ties two or more delegate caches together and makes them act as one.

In the two-tier example as shown in FIG. 2, the L1 map 201 is smaller and faster than the L2 Map 202 and thus L1 201 is queried before L2 202. The two caches are synchronized using a coherency synchronization strategy. In the example, there are two parts to the coherency synchronization strategy. The L2 map 202 can be updated with respect to changes in L1 map 201 via a Forward Strategy 203. Examples of forward strategies 203 include:
(1) Read Only—any attempt to update will be vetoed.
(2) Write Through—each update to L1 201 is immediately applied to L2 202.
(3) Paging—each update to L1 201 is applied to L2 202 only when L1 201 evicts something.
(4) Write Behind—each update to L1 201 is asynchronously applied to L2 201.

On the other hand, in the same example, L1 map 201 can be updated with respect to changes in L2 cache 202 using the listening scheme 204. The options for the listening scheme 204 are:
(1) No listen
(2) Listen all
(3) Listen selectively In accordance with one embodiment, a computer-implemented method to support caching service comprises: updating or querying a first cache 201; and updating or querying a second cache 202 with respect to the updating or querying of the first cache 201 via a forward strategy 203 or a listening scheme 204. For example, the forward strategy 203 can include at least one of: vetoing any attempt to update; applying immediately each update of the first cache to the second cache; applying update of the first cache to the second cache only when the first cache evicts an entry; and applying asynchronously each update of the first cache to the second cache. The listening scheme 204 can include at least one of: no listening; listening to all; and listening selectively. In accordance with one embodiment of the present invention, the first cache 201 can be smaller and faster than the second cache 202.

In accordance with one embodiment, the computer-implemented method can include a further step of holding a lock on one or more cache entries. There can be another further step of grouping a set of cached objects to enable complex event processing, wherein cache actions is automatically performed on related objects in the set of cached objects. There can be another further step of updating cache objects only at the end of a session. There can be another further step of creating the first cache and the second cache from a Cache Manager 101.

Figure 3:
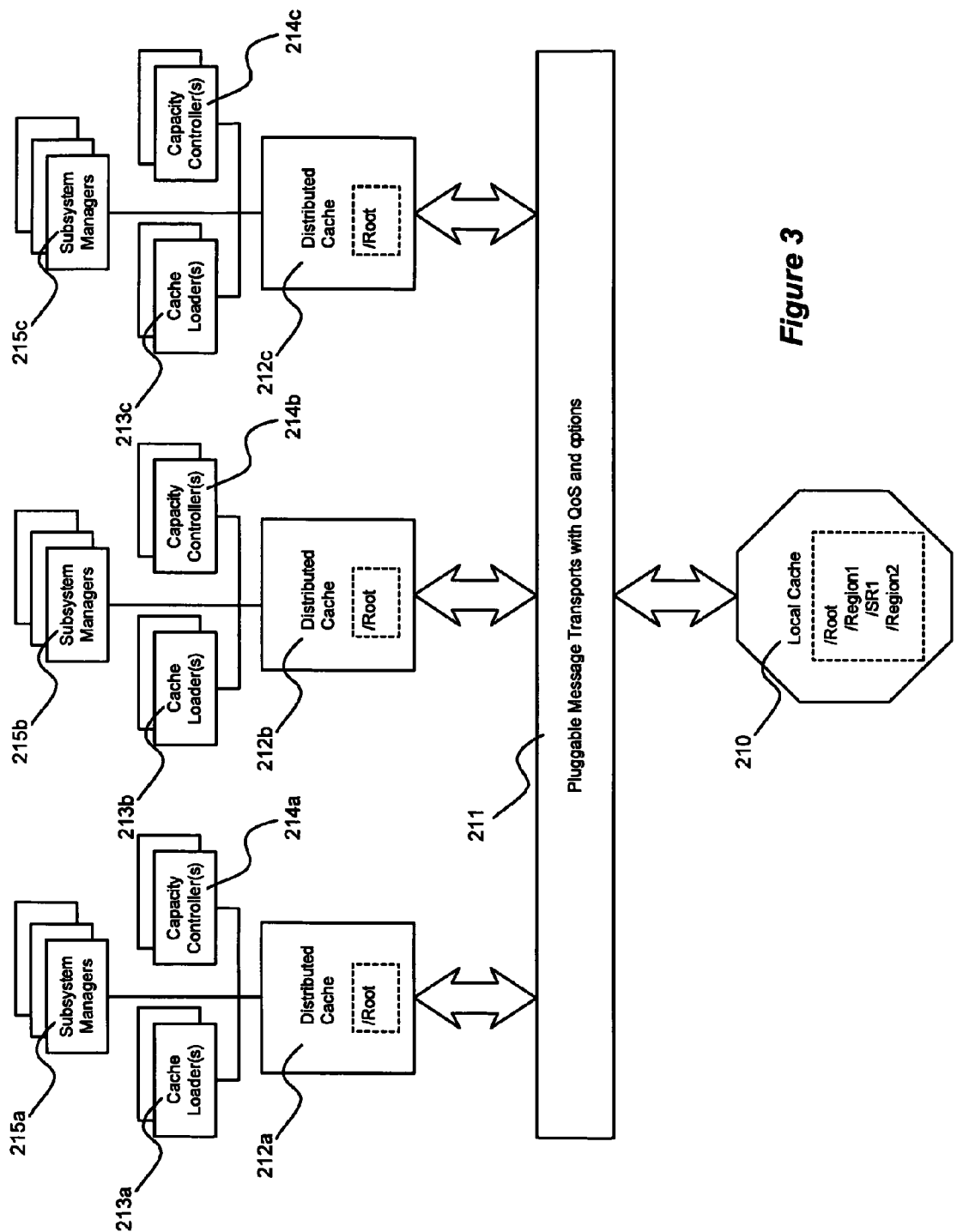
FIG. 3 is an illustration of an exemplary framework of distributed cache in accordance with one embodiment of the present invention.

In accordance with one embodiment, the first cache 201 and the second cache 202 can be capable of self loading. Also, the paging construct can be implemented using a tiered map with the customer cache as the L1 cache 201 and one cache map as an L2 cache 221. The two caches can be synchronized using the paging coherency strategy. Distributed Cache FIG. 3 is an illustration of an exemplary framework of distributed cache in accordance with one embodiment of the present invention.

In accordance with one embodiment of the present invention, caches can be classified into the following broad categories:
(1) Local caches—The entire cache can be hosted within one server instance
(2) Fully replicated caches—Each cluster member can host a copy of the entire cache contents. This is good for read mostly use cases.
(3) Partitioned caches—Cache data can be split across multiple cache partitions which each partition owning a section of the cache. Each partition can have one or more back-up(s) to support failover.

In addition, fully replicated caches can be further divided into two broad categories based on the data consistency amongst the cache copies:
Weakly consistent—Information in the cache copies is stale. A weakly consistent replicated cache can use an asynchronous mechanism to propagate cache changes to other cluster members. Group messaging infrastructure (multicast or unicast) can be used to accomplish asynchronous communication.

Strongly consistent—The cache information is consistent amongst all members of the cluster. Strong consistency can be achieved by holding a cluster wide lock on the cache entry and then replicating under the lock to other cluster members. Strong consistency depends on the presence of a cluster leader which in turn uses a leasing basis.

In some cases, the choice of a cache type is an administrative option, rather than a developer option. In other words, application code continues working with complete location transparency.

In accordance with one embodiment, a computer-implemented system to support distributed caching service can comprise one or more distributed caches 212a, 212b, and 212c that span over one or more Virtual Machine (VM) instances; and a pluggable message transport 211. For each distributed cache of the one or more distributed caches 212a, 212b, or 212c, there can be separate cache loaders 213a, 213b, or 213c, capacity controllers 214a, 214b, or 214c and subsystem managers 215a, 215b, or 215c. In addition, the computer-implemented system can further comprise one or more local caches 210.

In accordance with one embodiment, the one or more distributed caches 212a, 212b, and 212c in the computer-implemented system can be fully replicated caches, wherein each cluster member of the one or more distributed caches hosts a copy of an entire cache contents.

In one example, the one or more distributed caches 212a, 212b, and 212c are weakly consistent fully replicated caches that use asynchronous communication mechanism to propagate cache changes to other cluster members. In another example, the one or more distributed caches 212a, 212b, and 212c are strongly consistent fully replicated caches that use a cluster wide lock on a cache entry and then replicate under the lock to other cluster members.

In accordance with one embodiment, the one or more distributed caches 212a, 212b, and 212c are partitioned caches, wherein the partitioned cache can divide the cache entries into a plurality of partitions and hosts the plurality of partitions on one or more VM instances. In one example, the partitioned caches is created programmatically by using a CacheFactory. In another example, the partitioned caches are dynamically partitioned caches. In another example, each partition is an exclusive owner of a set of keys. In another example, a partition map for the partitioned caches uses a Java Naming and Directory Interface (JNDI) lookup that uses the partition map's JNDI name, wherein the JNDI lookup returns a smart proxy that holds a copy of a partition routing table and is able to rout cache operations to a right partition. In yet another example, partitions are configured to backup their data on one or more replicas hosted on other cluster members.

In accordance with one embodiment, a computer-implemented method to support distributed caching service comprises steps of storing one or more cache objects in one or more distributed caches 212a, 212b, and 212c that span over one or more Virtual Machine (VM) instances; and maintaining the one or more distributed caches 212a, 212b, and 212c using a pluggable message transport 211. In accordance with one embodiment of the present invention, the computer-implemented method can include a further step of storing one or more cache objects in one or more local cache 210;

In accordance with one embodiment, a weakly consistent replicated cache is implemented. Weakly coherent replicas of the cache map exist on all cluster nodes. This map uses unreliable transport (like multicast) to update the replicas when the map is updated. When map staleness is detected by any replica, it synchronizes with another node over a reliable transport. For mostly read only operations, this map scales well as map updates are applied asynchronously. The replicas tend not to eagerly synchronize themselves when they detect staleness. The replicas can maintain coherence; but in a weak sense.

A user can configure more than one weakly coherent distributed map each identified across the system by a unique name. Users can look up or create such maps using the CacheFactory interface as follows:

---
Listing-8: Weakly consistent map creation

Map properties = new HashMap( );
properties.put(CacheConstants.CACHE_TYPE,
CacheConstants.MULTICAST_DISTRIBUTED_MAP);
cacheManager.createCache("IncoherentCache", properties);

---

The following functional behaviors are exhibited by for a weakly consistent replicated cache:
(1) Initialization
(2) Cache updates
(3) HTTP for synchronization
(4) Listener
(5) Staleness detection
(6) Update propagation from a shutting down node In accordance with one embodiment, all cluster nodes listen for cache events over multicast. The cluster nodes initialize a special servlet for handling peer-to-peer communications over HTTP. This is the backup synchronous communication which the cache uses when it detects staleness.

When a cluster node first receives communication about a specific cache, it initializes an empty cache and updates it as it receives messages. The cache is also marked as stale.

Figure 4:
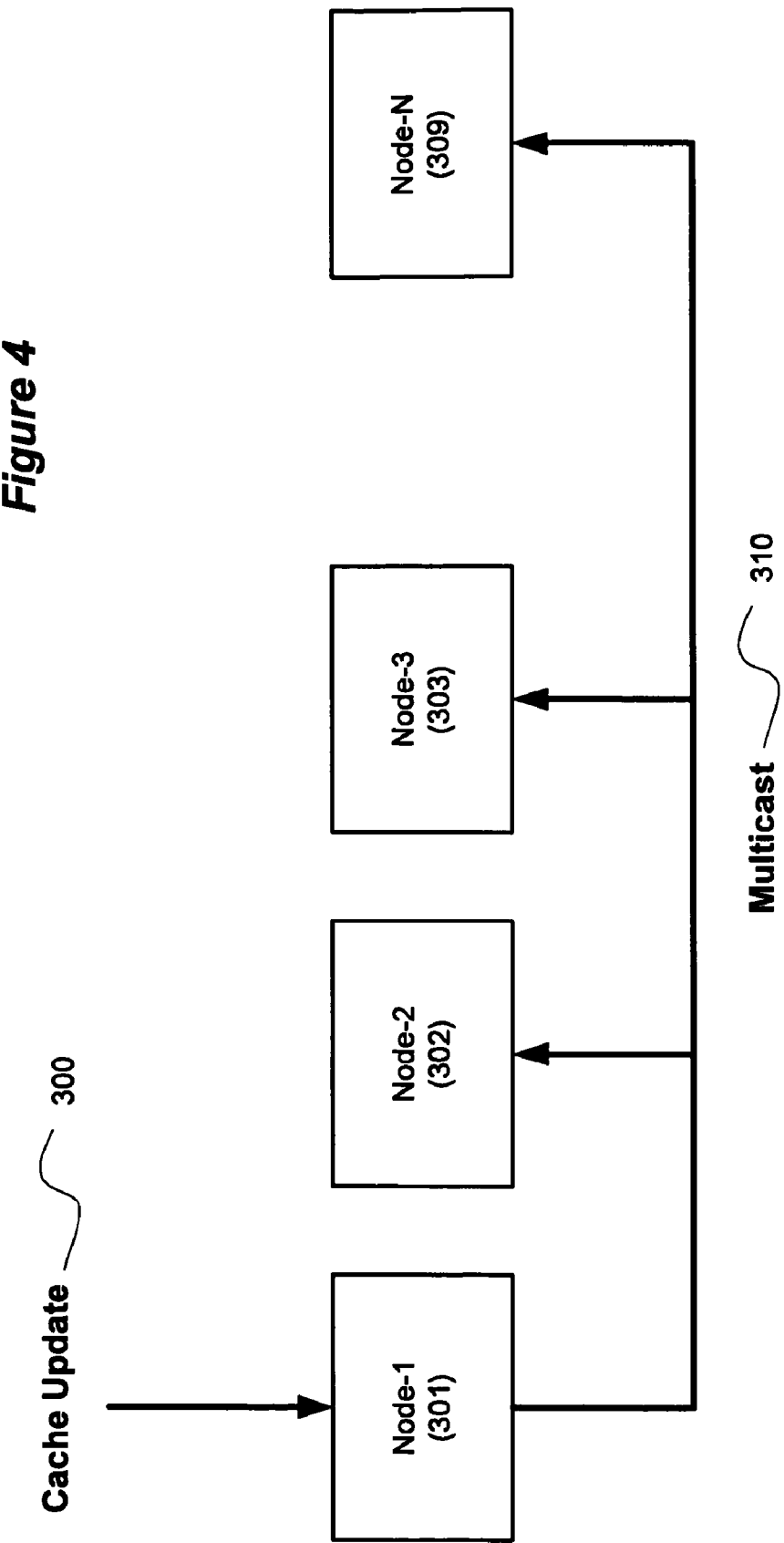
FIG. 4 is an exemplary illustration of cache update operation for a weakly consistent replicated cache in accordance with one embodiment of the invention.

FIG. 4 is an exemplary illustration of cache update operation for a weakly consistent replicated cache in accordance with one embodiment of the invention.

In the example shown in FIG. 3, an update 300 (put, removes or clear operation) to the cache on one node 301 triggers a message broadcast 310 to all the nodes 302, 303, and 309.

As nodes 302, 303, and 309 receive messages, they 302, 303, and 309 update their local copies validating if the versions upgrade is as expected. Otherwise the entry is marked as stale.

A recurring timer event can trigger periodically synchronizes the stale cache entries over a reliable transport.

In another example, message ordering and reliability for updates are provided by multicast session such as multicast session which has built-in functionality for recovery and fragmentation of messages larger than the multicast datagram size.

In accordance with one embodiment, in the case of staleness, the caches synchronize themselves over HTTP. The decision to choose HTTP is based on the fact that HTTP connections timeout when idle and this prevents an N-times-N mesh of connections.

In accordance with one embodiment, the implementation of the weakly coherent map is provided as a monitored map change listener which enables any map to be made weakly coherent just by wrapping it inside the listener.

Figure 5:
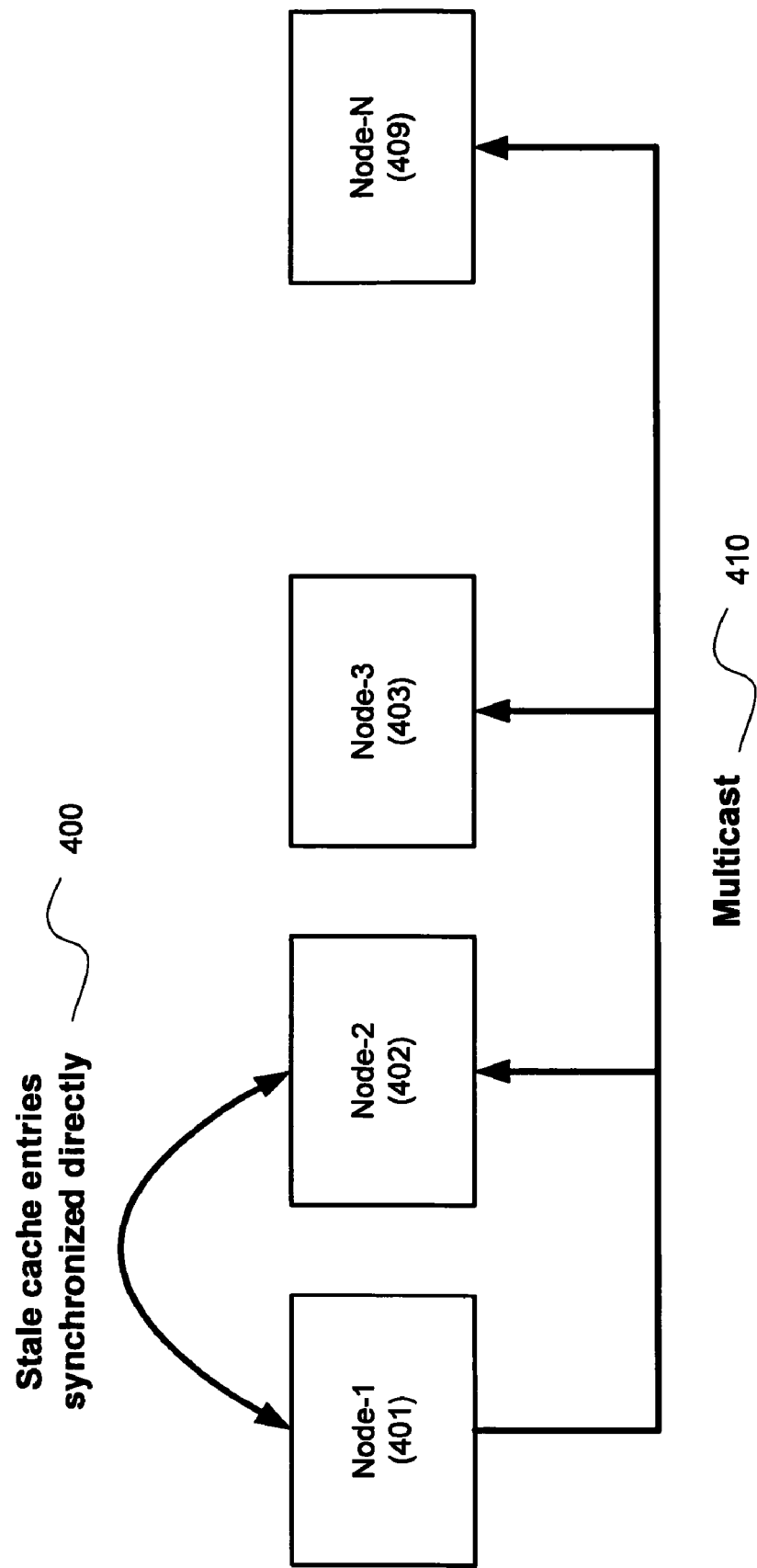
FIG. 5 is an exemplary illustration of synchronization of stale cache entries operation for a weakly consistent replicated cache in accordance with one embodiment of the invention.

FIG. 5 is an exemplary illustration of synchronization of stale cache entries for a weakly consistent replicated cache in accordance with one embodiment of the invention.

In accordance with one embodiment, every change to a Cache entry is tagged with a version id. The caches keep track of version changes as updates are applied. If caches find out that they have the latest versions, updates are dropped. If they find out that they have an older version for which the update is applied, the entry is marked as stale and is ready to be synchronized by the trigger 400.

Figure 6:
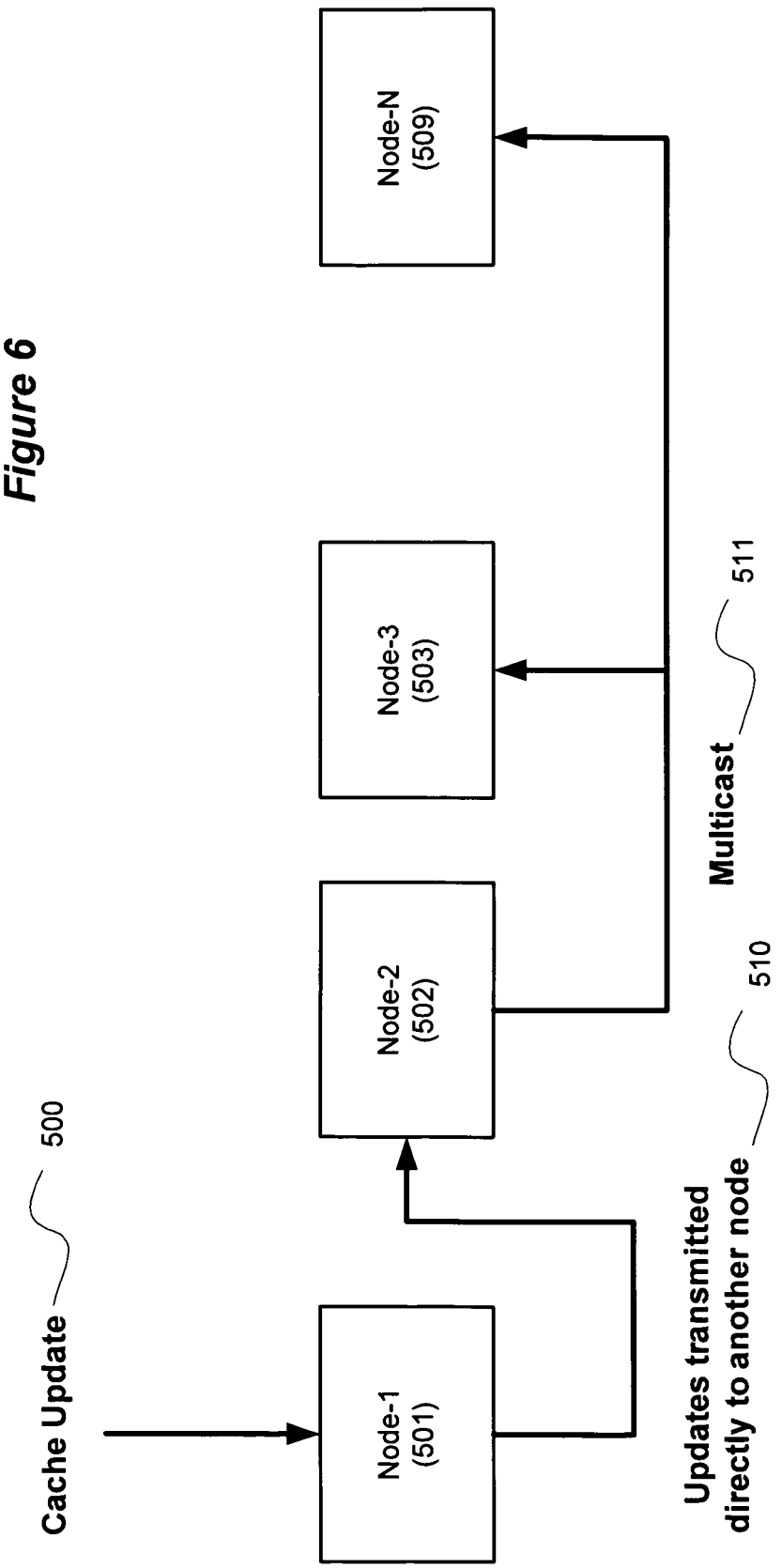
FIG. 6 is an exemplary illustration of cache updates to a node shutting down operation for a weakly consistent replicated cache in accordance with one embodiment of the invention.

FIG. 6 is an exemplary illustration of cache updates to a node shutting down for a weakly consistent replicated cache in accordance with one embodiment of the invention.

In the example shown in FIG. 5, when a node is being shutdown 501, the cache updates 500 is sent to another healthy cluster node 502 over a reliable transport 510 and the target node 502 then broadcasts 511 the changes on behalf of the shutting down node 501.

In accordance with one embodiment of the present invention, the behavior of local cache configuration options with for a weakly consistent replicated cache includes:
(1) Eviction policies—The eviction policies are applied locally on each node. Any changes to the underlying cache due to evictions can be propagated to all the nodes.
(2) Cache update listeners—Users register update listeners on any member and get updates made to the replicated map.
(3) Cache statistics are local—may not to replicate statistical information about the cache entries.

In addition, delayed coherence and conflict resolution can also be implemented for a weakly consistent replicated cache.

In accordance with one embodiment, nodes have inconsistent data between the sync periods. Timely nodes sync up with others can resolve stale data. A configuration parameter is provided to configure the sync interval.

Concurrent updates to the same key on multiple nodes can result in keys having different values on different nodes. Nodes in the cluster are given precedence based on the server name, server identity and some other constant parameters. The precedence order of the servers is identical on all the nodes as the order is calculated based on constants. In one example, when a node receives multiple updates for the same key with the same version, the update from the highest precedence server wins. Ultimately consistency is achieved in all the nodes.

In accordance with one embodiment, a strongly consistent replicated cache is created programmatically by using the CacheFactory as shown below:

---
Listing-9: Strongly consistent map creation
---
Map properties = new HashMap( );
properties.put(CacheConstants.CACHE_TYPE,
CacheConstants.COHERENT_REPLICATED_CACHE_TYPE);
cacheManager.createCache("ReplicatedCache", properties);
---

In one example, servers that create the coherent replicated map using the following snippet form a group and keep the cache entries in sync. This means that each server in the cluster creates the coherent replicated cache type with the same name to join the group. Cluster members that do not create the cache locally are able to get the updates.

Figure 7:
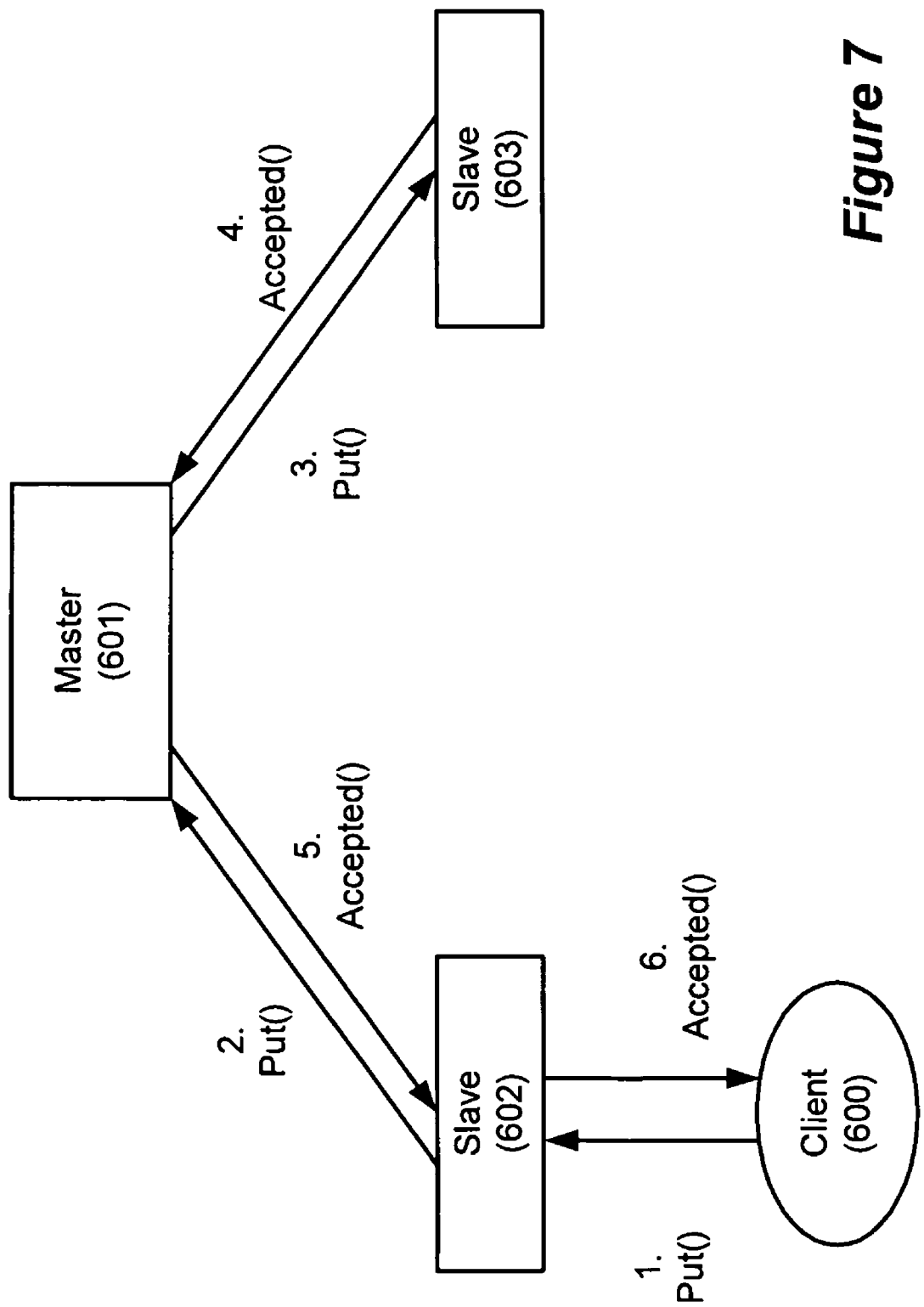
FIG. 7 is an exemplary illustration of mutation operation sequence for a strongly consistent replicated cache in accordance with one embodiment of the invention.

The following functional behaviors are exhibited by a strongly consistent replicated cache:
(1) Servers creating the cache locally using the CacheFactory API can enroll with other cluster members that have a cache with the same type and name.
(2) Servers can compete to become the master of the replicated cache.
(3) One server becomes the master and the rest of the group members' act as slaves.
(4) Master election is done using Leasing API
(5) Another Master is elected when the current master server dies FIG. 7 is an exemplary illustration of mutation operation sequence for a strongly consistent replicated cache in accordance with one embodiment of the invention.

In the example as shown in FIG. 6, mutation operations by group members 602 on their local maps cause a remote call to be made to the master 601. The master 601 performs the following operations:
(1) Obtain a lock on the map entry
(2) Replicate the change to all group members 603 under the lock
(3) Respond back to the group member 602 requesting the change In one example, when the master 601 fails, mutation operations on the map can be prevented with a well-defined exception.

Figure 8:
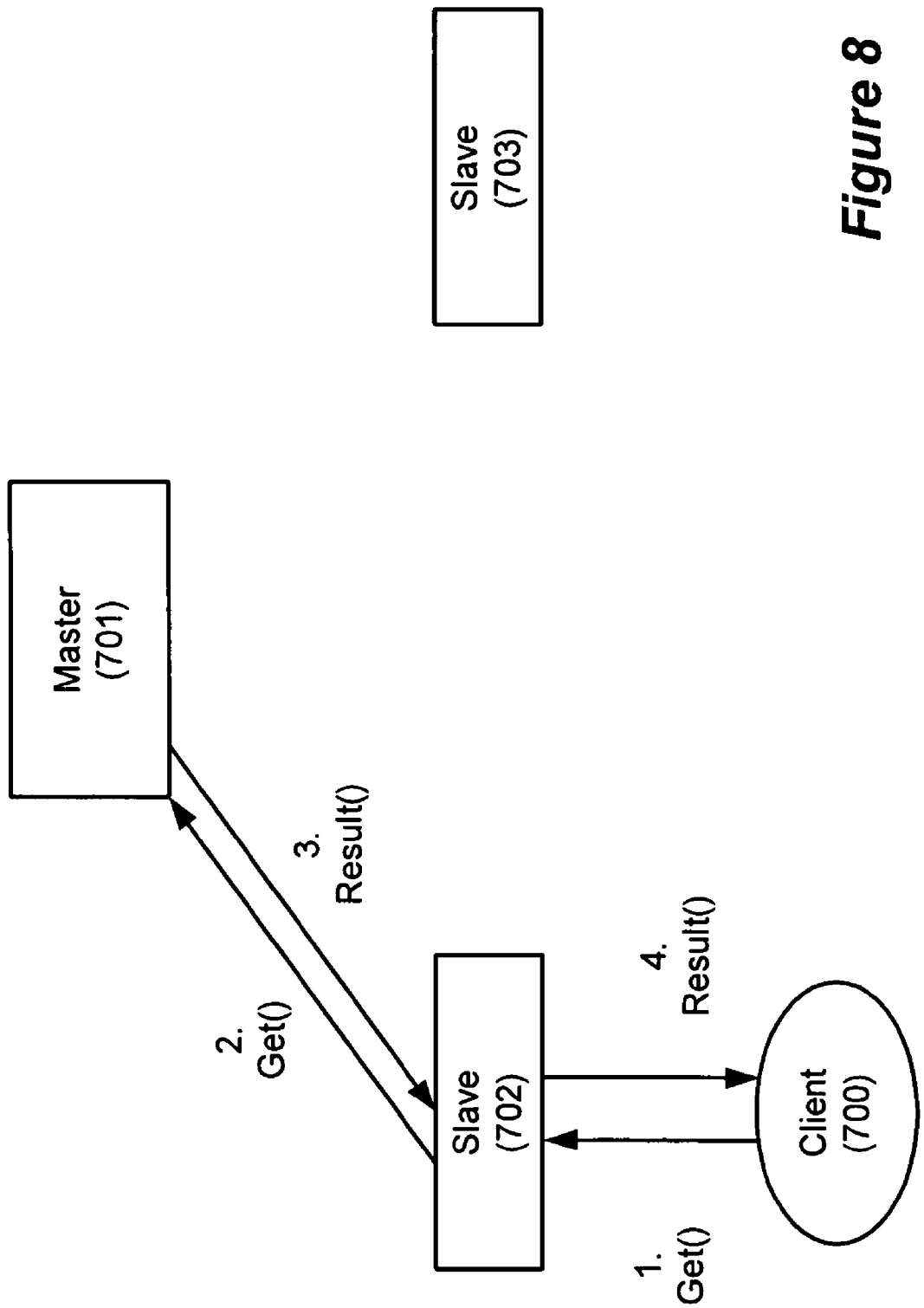
FIG. 8 is an exemplary illustration of accessory operation sequence for a strongly consistent replicated cache in accordance with one embodiment of the invention.

FIG. 8 is an exemplary illustration of an accessory operation sequence a strongly consistent replicated cache in accordance with one embodiment of the invention.

In the example as shown in FIG. 8, accessory operations by group members 702 on their local maps cause a remote call to be made to the master 701. The master 701 performs the following operations:
(1) Obtain a lock on the map entry
(2) Return the accessed map entry under the lock In one example, accessory operations on the map continue to work in the absence of the master 701. The group member 702 first tries to contact the master 701. The local map entry is returned if the master 701 is unavailable.

The behavior of local cache configuration options with a strongly consistent replicated cache includes:
(1) Eviction policies—All the local cache eviction policies can be supported. The eviction policy can be active only on the master map. The master map can communicate to the slaves.
(2) Cache update listeners—Users can register update listeners on any member and get updates made to the replicated map.

In accordance with one embodiment vention, Partitioned caches are implemented to include cache data that are split across multiple cache partitions wherein each partition owns a section of the cache. Each partition has one or more backup(s) to support failover. Partitioned caches are divided into two types:
(1) Static partitioned caches—The key to partition associated may not be changed. A key cannot dynamically migrate from one partition to another.
(2) Dynamically partitioned caches—The key to partition association can change during the lifetime of the cluster.

In accordance with one embodiment, a partitioned cache divides the cache entries into multiple partitions and hosts the partitions on different JVM instances. This is useful when the in-memory data set is very large and cannot be hosted on a single JVM instance.

A partitioned cache is created programmatically by using the CacheFactory like this ---
Listing-10: Partitioned Cache creation
---
Map properties = new HashMap( );
properties.put(CacheConstants.CACHE_TYPE,
CacheConstants.PARTITIONED_CACHE_TYPE);
ArrayList list = new ArrayList(4);

-continued

Listing-10: Partitioned Cache creation

```
// create named partitions and optionally assign preferred
    servers to them
list.add(new Partition("p1", "managed1"));
list.add(new Partition("p2", "managed1"));
list.add(new Partition("p3", "managed2"));
list.add(new Partition("p4", "managed3"));
properties.put(CacheConstants.PARTITIONS, list);
cacheManager.createCache("PartitionedCache", properties);
```

In the above example, the user has requested a partitioned map with four partitions—p1, p2, p3, p4. Furthermore, each of the partitions has a preferred server assigned to it. The cluster tries to host the partitions on the preferred servers as much as possible. The partitions host on non-preferred servers if the preferred servers are unavailable.

Users configure the number of partitions for each partitioned map. In some case, it is recommended to over configure the number of partitions to take advantage of cluster size growth in the future. The cluster distributes the partitions amongst its existing members. If more servers are added in future, the partitions can be redistributed to reduce load on the existing servers.

In accordance with one embodiment, each partition is the exclusive owner of a set of keys. The entire key range is divided amongst the partitions such that only one partition is the active owner of any given key.

The key to partition can be configured in two ways:
 (1) Default mapping—By default, the implementation relies on the key's hash code for the routing. A simple mod operation using the hash code and the partition size can determine the hosting partition for the key.
 (2) Custom mapping—Users can provide a custom key to partition mapping by providing an implementation of KeyToPartitionLocator interface. The implementation can return a partition given a key.

In accordance with one embodiment, Clients are able to lookup the partitioned map from JNDI using the partitioned map's JNDI name. The lookup is directed to any cluster member. The JNDI lookup can return a smart proxy that is able to route cache operations to the right partition. The smart proxy holds a copy of the partition routing table that helps it route the calls to the right partition. The partition routing table can be dynamically changed on the clients with partitions migrate from one server to another. Clients may not be required to re-lookup the partitioned map when the partition routing table changes.

Partitions are configured to backup their data on one or more replicas hosted on other cluster members. This allows the partitions to be highly available. Replicas are configured in the following ways:
 (1) Replicate partition data synchronously to one or more backup servers in the cluster
 (2) Replicate the partition data asynchronously to one or more backup servers in the cluster.
 (3) Use a combination of (1) and (2) to replicate synchronously to 'N' members and also asynchronously replicate to 'M' members in the cluster.

In accordance with one embodiment, the replicas have a hierarchical order that decides when a replica becomes the primary. When the primary dies, the highest ranking live replica can become the next primary. Clients can try the highest ranking replica when they are not able to reach the primary.

In accordance with one embodiment, partitioned cache exhibits the following behavior:
 (1) All the partitions can be active as long as one cluster member is alive.
 (2) Partitioned cache can wait for a warm-up period during cluster startup before attempting to assign partitions to preferred servers. Partitions can be assigned to non-preferred servers if the preferred servers are not running after the warm-up period.
 (3) A partition assigned to a non-preferred server may not be assigned back to the preferred server the moment it is started. Preference can be given to the preferred server when the partitions need to be rebalanced.

In accordance with one embodiment, assignment of partitions to servers is done as follows:
 (1) Partitions can be assigned to preferred servers
 (2) Remaining partitions can be evenly distributed across the cluster
 (3) Partitions can be rebalanced with new members are added to the cluster.

In accordance with one embodiment, the rebalancing occurs as follows:
 (1) The newly started servers can try to host partitions that specify them as preferred hosts.
 (2) As a second step, partitions can be rebalanced such that running servers will try to host equal number of partitions.
 (3) Upon server shutdown, partitions assigned to it are migrated to existing servers uniformly.

In one example, partitioned map clients may not need to know the physical location of the partitions in order to access the cache entries. Clients can get complete location transparency. Only serializable entries are put in the partitioned map.

In accordance with one embodiment of the present invention, behaviors of local cache configuration options with a partitioned cache include:
 (1) Eviction policies—All the local cache eviction policies can be supported. Each partition will apply the eviction policies independently on the key set it owns.
 (2) Cache update listeners—Users can register update listeners on the partitioned map and get updates from the right partition.

In accordance with one embodiment, a fully replicated cache propagates its updates to all live cluster members. Optionally, customers can specify a list of servers that will host the replicated cache. The candidate list is a subset of the entire cluster. This is similar to candidate list for singleton services or migratable targets.

In one example, a special note may need to be made for app-scoped replicated caches. If the application is homogenously deployed in the cluster then the entire cluster can participate in the replicated cache. But in a special case where the application is not homogenously deployed then replication can be limited to cluster members that have the application deployed.

Transactional Cache

In accordance with one embodiment, a cache is made transactional when it is created. The CacheFactory provides methods to create caches based on a properties Map. The properties Map includes the following transaction-related properties:
 (1) The type of transaction to use—pessimistic or optimistic.
 (2) The transaction isolation level.
 (3) Properties describing whether to use manual transactions or JTA integration, and how to integrate with the JTA TransactionManager.

Listing-11 shows an example:

---
Listing-11: Transactional cache creation

```
Map properties = new HashMap( );
properties.put(CacheConstants.TRANSACTION_TYPE,
CacheConstants.PESSIMISTIC);
    properties.put(CacheConstants.ISOLATION_LEVEL,
    CacheConstants.REPEATABLE_READ);
    Map transCache =
    cacheManager.createCache("TransactionalCache", properties);
```
---

In accordance with one embodiment, the cache support slocal pessimistic transactions with the following standard isolation levels:

(1) NONE
(2) READ_UNCOMMITTED
(3) READ_COMMITTED
(4) REPEATABLE_READ

If the isolation level is set to NONE, the cache is not transactional. Otherwise, the internal cache is wrapped in a transactional decorator. Using the decorator pattern provides a strong separation of concerns, allows the cache to remain focused on basic data storage and retrieval, while the decorator handles transactional behavior. The implementation detail of the decorator pattern can be hidden to outside code.

In accordance with one embodiment, the default pessimistic transaction isolation can be REPEATABLE_READ. The transaction isolation levels are implemented using a combination of read and write locks to isolate changes.

In accordance with another embodiment of the present invention, while pessimistic transactions is set as the default, the cache also supports local optimistic transactions. All optimistic transactions have NONE or REPEATABLE_READ isolation; other configured isolation levels are automatically upgraded to REPEATABLE_READ.

The motivation for optimistic transactions is to improve concurrency. When there is heavy contention for cache data, it is inefficient to lock portions of the cache for extended periods of time, as pessimistic transactions often do. Optimistic transactions allows for greater concurrency by using data versioning in place of locking.

Data versioning works by recording the version of each cache entry as it is accessed throughout the transaction. When the transaction commits, the recorded version for each entry is compared to entry's current version in the cache. In the event of a version mismatch, the commit fails, if a concurrent transaction alters the entry—thereby increments its version— after the first transaction records the entry's version, but before the first transaction commits.

Optimistic transactions use the same read and write locks used in pessimistic transactions, but the locks are only held for a very short duration: when an entry is retrieved, and when the transaction merges its isolated changes back into the main cache on commit. So while optimistic transactions may occasionally force a rollback if version validations fail or may run slightly slower than pessimistic locking due to the inevitable overhead of recording data versions and validating on commit, they allow for a high level of isolation while also maintaining a very high level of concurrency.

Figure 9:
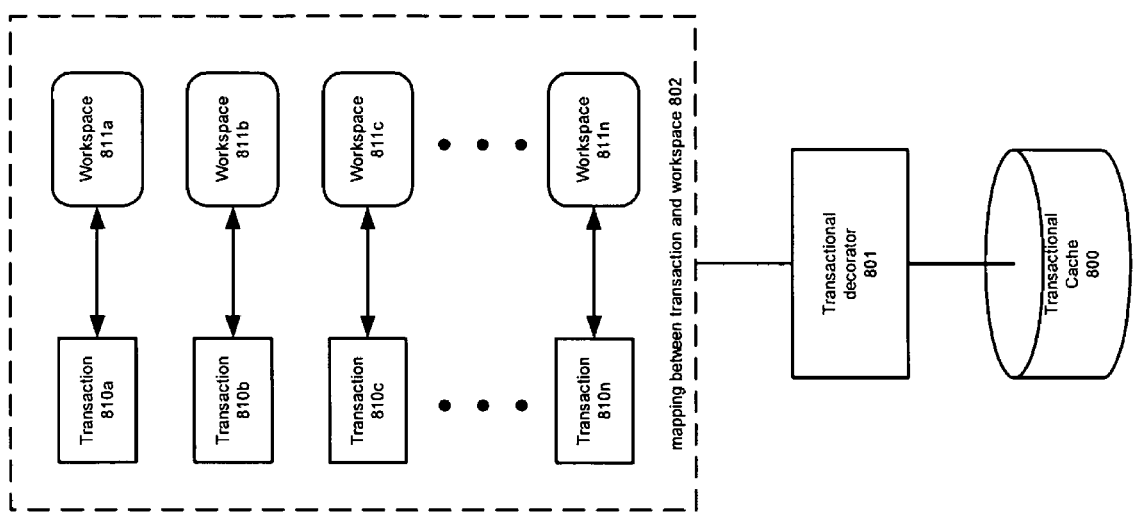
FIG. 9 is an illustration of an exemplary framework of transactional cache in accordance with one embodiment of the present invention.

FIG. 9 is an illustration of an exemplary framework of transactional cache in accordance with one embodiment of the present invention.

One embodiment of the present invention is a computer-implemented method to support transactional caching service that comprises: configuring a transactional cache that are associated with one or more transactions 810a-n and one or more work spaces 811a-n; maintaining an internal mapping 802 between the one or more transactions 810a-n and the one or more work spaces 811a-n in a transactional decorator 801; getting a transaction 810a with one or more operations; using the internal mapping 802 in the transactional decorator 801 to find a work space 811a for the transaction; and applying the one or more operations of the transaction 810a to the workspace 811a associated with the transaction 810a. In accordance with one embodiment of the present invention, the transactional cache is configured using an isolation level.

In accordance with one embodiment, the computer-implemented method comprises a further step of creating the internal mapping 802. There can be another further step of obtaining locks on affected entries based on a configured isolation level for a pessimistic transaction. There can be another further step of recording versions of affected entries. There can be another further step of initiating a transaction completion process when user issues a commit or rollback, or when current transaction ends. In one example, the transaction completion process uses the standard synchronization call backs: beforeCompletion and afterCompletion.

In accordance with one embodiment, the computer-implemented method comprises a further step of grouping a set of cached objects to enable complex event processing, wherein cache actions are automatically performed on related objects in the set of cached objects. There can be another further step of updating cache objects only at the end of a session. In addition, the computer-implemented method can comprise a further step of creating the transactional cache from a Cache Manager. In Also, the transactional cache is capable of self loading and provides XA transaction support.

In accordance with one embodiment, a transactional cache appears as a single JVM map, just as non-transactional caches do. When accessed in different transactional contexts, however, a transactional cache can present isolated views. It can accomplish this by maintaining an internal mapping between each transaction and the data it has changed, or its workspace. In some examples, workspaces may only be merged into the cache's backing data on successful commit.

In accordance with one embodiment, this usage pattern maximizes transparency to users and allows us to naturally enforce strict thread affinity for transactions. The locking necessary to implement transactional isolation often require to match a client requesting a lock to any locks that client might already hold, and to identify clients by thread provides a simple way to do this. Without thread affinity, we likely have to complicate our entire API stack by passing client identifiers or already-held locks to all map operations.

In accordance with one embodiment, the transactional decorator adds the following primary APIs to the standard CacheMap:

---
Listing-12: Transactional Map API

```
package weblogic.cache.transaction;
/**
 * A {@link CacheMap} with transactional capabilities.
 */
public interface TransactionalCacheMap
    extends CacheMap {
    /**
     * The transaction for the calling context.
     */
    public CacheTransaction getTransaction( );
    /**
     * Immutable view of the transactional workspace for
```

Listing-12: Transactional Map API (continued)

```
     * the calling context.
     */
    public Workspace getWorkspace( );
    /**
     * Set a value update for the given key. During
     * transactions, value updates are buffered until
     * commit.
     * @return the previously-buffered update for this key
     */
    public ValueUpdate setValueUpdate(Object key,
        ValueUpdate update);
}
/**
 * Current transaction.
 */
public interface CacheTransaction {
    /**
     * Whether a transaction is in progress.
     */
    public boolean isActive( );
    /**
     * Begin a transaction.
     */
    public void begin( );
    /**
     * Commit the current transaction.
     */
    public void commit( );
    /**
     * Rollback the current transaction.
     */
    public void rollback( );
    /**
     * Mark the current transaction for rollback.
     */
    public void setRollbackOnly( );
}
```

In accordance with one embodiment, each operation on a transactional cache results in the following general chain of events:

(1) Get the transaction for the current thread. If no transaction is in progress, pass the operation through to the underlying cache. Otherwise:
(2) Use the transactional decorator's internal mapping between transactions and workspaces to find the transaction's workspace. If none exists, create one.
(3) If a pessimistic transaction, obtain locks on the affected entries based on the configured isolation level. If an optimistic transaction, record the versions of the affected entries.
(4) Apply the operation to the workspace.

In accordance with one embodiment, when the user issues a commit or rollback, or when the current JTA transaction ends, the transaction completion process can be initiated. Cache transaction completion uses the standard synchronization callbacks: beforeCompletion and afterCompletion. In beforeCompletion, workspaces changes are batched into an action—an object that performs a series of operations on the cache. This action has two phases. The prepare phase obtains write locks on all modified entries, subject to the configured transaction isolation. If the transaction is optimistic, this phase also validates the versions of all entries against the transaction's recorded versions. The transactional changes are then applied to the underlying cache, and the previous state are saved for rollback. The run phase executes a rollbacks if necessary. In one example, the beforeCompletion callback only performs the prepare phase.

In accordance with one embodiment, the steps taken in the afterCompletion callback depends on whether the transaction was rolled back or committed. If it is rolled back, after-Completion performs the run phase of the action prepared in beforeCompletion to roll back cache changes. If the transaction commits, however, the action is simply closed. In both cases, all locks are released and the transactional workspace is cleared.

Thus, implementing ACID transactions is achieved through a combination of workspaces, read-write locks, and action objects. The transactional decorator maintains workspaces and defines actions. Implementing read-write locks and running actions, however, can be functions of the underlying cache.

Logically, every cache entry can have a read lock supporting multiple readers, and an exclusive write lock allows neither readers nor other writers. In practice, a cache can lock regions or other coarse-grained constructs in place of individual entries. Read locks are upgradable to write locks. Lock ownership is thread-based, and requesting a lock that is already held by the current thread has no effect. Even in the absence of transactions, reading an entry can implicitly acquire and immediately release its read lock, and changing an entry acquires and immediately releases its write lock. For local transactions, only local locks can be required. To additionally support full ACID transactions across a cluster, cluster-wide locks are required. Importantly, however, no changes to the transactional decorator are needed. In some examples, the clustered cache may need only to implement its lock APIs to use cluster-wide locks instead of local ones.

Actions are used to batch operations. An action can be given a reference to the cache and can perform any series of operations it likes. Actions can be serializable, so they can be sent in a single trip to run on a cache in a separate JVM, rather than incurring the overhead of many individual remote calls.

Listing-13: The Action interface

```
package weblogic.cache;
/**
 * A bulk operation.
 */
public interface Action
    extends Serializable {
    /**
     * The system will set the target cache before the
     * action is used.
     */
    public void setTarget(CacheMap cache);
    /**
     * Perform the action.
     */
    public Object run(Object arg);
    /**
     * Clean up the resources held by this action. This
     * method is automatically called if any method throws
     * an exception, or after {@link #run}. It can also be
     * manually invoked via the action's trigger.
     */
    public void close( );
}
```

Running an action is a two-phase process. Asking the cache to prepare an action returns a trigger that can then be used to run or close the prepared action.

Listing-14: The ActionTrigger interface

```
package weblogic.cache;
public interface CacheMap ... {
   public ActionTrigger prepare(Action action);
   ...
}
/**
 * Trigger or close an action.
 */
public interface ActionTrigger {
   /**
    * Run the action, returning the result.
    */
   public Object run(Object arg);
   /**
    * Manually close the action. Actions are closed
    * automatically if they throw an exception or after
    * they are run.
    */
   public void close( );
}
```

The value of having a separate prepare phase are two-fold. First, it allows the encapsulation and easy cancellation of a multi-step process in which resources are held between steps, such as the beforeCompletion, afterCompletion commit process described above. More importantly, though, a properly implemented prepare phase increases the likelihood that an action can succeed completely or fail completely. This is particularly useful in clustered caches. For example, a synchronously replicated clustered cache uses the prepare phase to ensure an action is successfully sent and prepared in each node before attempting to run it. Like clustered locking, this is transparent to the transactional decorator.

Mutable Object Handling

Cached objects are generally opaque to the cache service. In some cases, changes to their internal state and relations may not be detected, object identity may not be preserved, and they can be transferred across JVM boundaries via serialization.

This opacity can be acceptable for immutable types, but introduces programming difficulties and performance bottlenecks for types with mutable state and relations. First, it can force the user to micro-manage the cache: whenever an object is updated, the user can notify the cache of the change. Object updates also may not obey the configured transactional isolation level: a change to the internal state of an instance can be visible to all local cache consumers. On the performance front, the use of serialization can be extremely inefficient. For large objects or nodes in a large object graph, even a single field update can trigger serialization of the whole object or the entire graph for replication across the cluster. Finally, Java object serialization cannot preserve object identity. Multiple lookups of the same remotely cached object can return different JVM instances, and caching the same object under multiple keys (possibly as part of multiple object graphs) can result in different JVM instances for each key upon retrieval.

In accordance with one embodiment, users can configure any or all of their custom classes for mutable object handling. Mutable Object is an object whose internal state can be mutated by the user. This includes instances of user-defined classes that have been identified as mutable via configuration, as well as instances of standard mutable types such as collections, maps, and dates. Under mutable object handling, changes to the internal state and relations of instances are detected automatically. Object identity is preserved across cache keys and multiple lookups. In some case, mutable objects may not be serialized. In addition to configured user-defined classes, the cache system handles many standard types as mutable objects, including collections, maps, and dates.

In accordance with one embodiment, the cache system includes specialized mutable object handling for cache values. Instances of standard mutable types such as collections, maps, and dates can be automatically handled as mutable objects. The user can also target any or all of his classes for mutable object handling.

In accordance with one embodiment, under mutable object handling, a mutable object is stored in multiple cached object graphs and is reachable via multiple paths in the same object graph. Retrieval of the same mutable object always returns the same JVM instance, regardless of the retrieval path—the cache key and relation traversal—used to navigate to the object. Changes to mutable objects, including the changing of relations between mutable objects, are detected automatically, whether the objects are graph roots or arbitrary nodes in a cached object graph. These changes are also isolated according to the configured transactional semantics. Finally, when a once-cached mutable object is no longer referenced from any cached object graph, the cache can detect that it is no longer needed and reclaims any space it used. In addition, mutable objects as cache keys can be supported in one embodiment of the present invention.

In accordance with one embodiment, mutable object handling is transparent to outside code. Like other caches, mutable-handling caches generally behaves like extended maps, and the mutable object graphs they contain are indistinguishable from graphs of normal Java objects. The only major exception to this transparency is transactional isolation. When a cached instance is mutated within a transaction, the changes can be only visible to that transaction's context. Only when the transaction successfully commits do the changes become visible to other cache consumers. This is accomplished by applying the same workspace pattern used in transactional caches to mutable object state. That is, a transactional mutable object can draw its state from the transaction's isolated workspace rather than its own instance fields.

In accordance with one embodiment, the described usage pattern maximizes transparency to users while maintaining proper transactional semantics. Users can manipulate mutable object graphs normally and can share them across threads, though changes made in transactional threads may not be visible to other threads until commit. Use of the workspace pattern minimizes exclusive locking. Without it, transactional objects are exclusively locked immediately on modification to prevent dirty reads, even within optimistic transactions.

In accordance with one embodiment, mutable object handling is implemented as a decorator atop a session or transactional cache. The cache remains focused on basic data storage and retrieval as well as workspace maintenance, while the mutable-handling decorator takes care of the requirements enumerated above. To do so, the mutable-handling decorator transparently translates between user-visible object graphs and a flat cache space, and maintains an internal instance map. The instance map is a memory-sensitive mapping between unique ids assigned to mutable object (see below) and the JVM instance instantiated for that object. The instance map is responsible for maintaining mutable object identity across lookups and object graphs.

Figure 10:
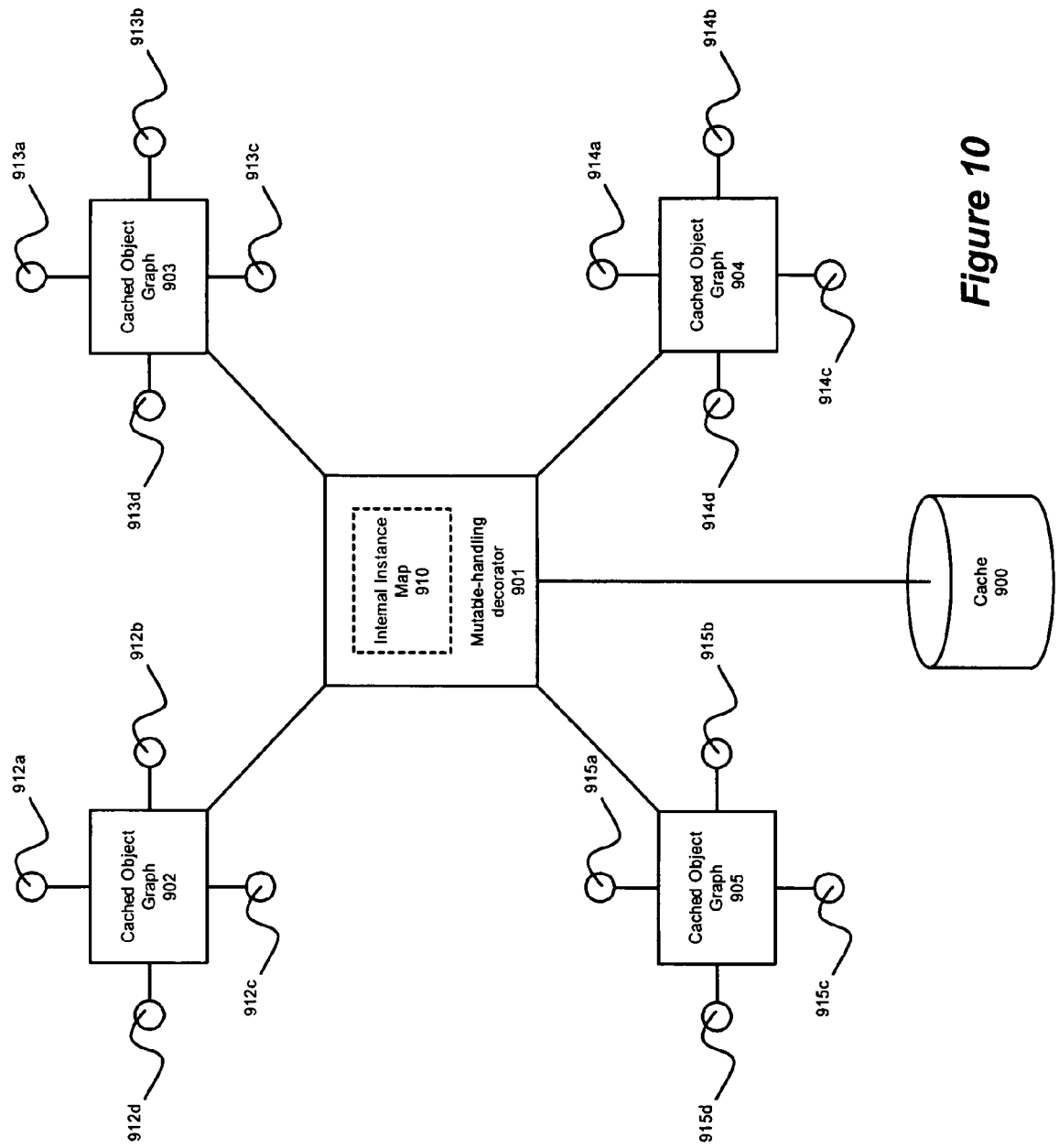
FIG. 10 is an illustration of an exemplary framework of mutable object handling in accordance with one embodiment of the present invention.

FIG. 10 is an illustration of an exemplary framework of mutable object handling in accordance with one embodiment of the present invention.

One embodiment of the present invention is a computer-implemented system to support mutable object handling, that comprises a cache space 900 that is capable of storing one or more mutable cache objects; one or more cached object graphs 902, 903, 904, and 905, wherein each one of the one or more mutable cache objects is reachable via one or more retrieval paths 912a, 912b, 912c, and 912d; 913a, 913b, 913c, and 913d; 914a, 914b, 914c, and 914d; and 915a, 915b, 915c, and 915d of the one or more cached object graphs 902, 903, 904, and 905; and a mutable-handling decorator 901 that maintains an internal instance map 910 that transparently translates between the one or more cached object graphs 902, 903, 904, and 905 and the one or more mutable cache objects stored in the cache space.

In accordance with one embodiment, the cache space 900 can include one or more caches. In accordance with one embodiment of the present invention, a cache in the one or more caches is a session or transactional cache. In accordance with one embodiment of the present invention, the one or more cached object graphs 902, 903, 904, and 905 are visible to the users.

In accordance with one embodiment, the instance map 910 is a memory sensitive mapping between unique ids assigned to a mutable cache object and a Java Virtual Machine (JVM) instance initiated for the mutable cache object.

In accordance with one embodiment, the one or more retrieval paths 912a, 912b, 912c, and 912d; 913a, 913b, 913c, and 913d; 914a, 914b, 914c, and 914d; 915a, 915b, 915c, and 915d include a cache key and relation traversal. The mutable-handling decorator 901 automatically detects the changing of relation between mutable objects. Mutable objects are stored in the cache space as structs of immutable state, including immutable field values and the ids of related mutable values. Hooks are used to construct instances of user-defined classes and transfer their state to and from cached structs. Also, instances of standard mutable types present in mutable object graphs are replaced with instances of subclasses on flush.

In accordance with one embodiment, a computer-implemented method to support mutable object handling comprises: maintaining an internal instance map 910 in a mutable-handling decorator 901 that transparently translates between one or more cached object graphs 902, 903, 904, and 905 and one or more mutable cache objects stored in a cache space; and reaching a mutable object from one or more cached object graphs, wherein each cached object graph includes one or more retrieval paths 912a, 912b, 912c, and 912d; 913a, 913b, 913c, and 913d; 914a, 914b, 914c, and 914d; and 915a, 915b, 915c, and 915d.

In accordance with one embodiment, there can be further steps of storing a mutable object in the cache space 900 through the one or more cached object graphs 902, 903, 904, and 905; and retrieving the mutable object from the cache space through the one or more cached object graphs 902, 903, 904, and 905.

When a user adds a cache entry (K,V), where V is a mutable object, the mutable-handling decorator can perform the following steps on flush:

(1) Assign V a globally unique id.
(2) Add an entry mapping this id to V in the decorator's internal instance map.
(3) Create a struct to represent V in the cache. This struct holds V's immutable field state, V's reference count (see step 5), and the unique ids of V's relations (see step 6).
(4) Add V's struct to the cache, keyed on V's id.
(5) Set V's initial reference count to 1.
(6) Apply steps 1-5 recursively to V's relations, traversing the entire object graph reachable from V. Increment reference counts appropriately as we discover cross-references between objects in the graph.
(7) Add a cache entry mapping K to V's id.

In accordance with one embodiment, when a user retrieves a key K, the decorator can do the following:

(1) Check to see whether K's value is the id of a mutable object. If not, return the value directly. Otherwise:
(2) Check the instance map to see if a JVM instance has already been constructed for the struct matching this id. If so, return it. Otherwise:
(3) Find the struct for the given id in the cache. Construct a JVM instance of the correct user-visible class for the struct, and populate it with the struct's stored data. Add an entry mapping the id to this JVM instance in the instance map.
(4) Apply this process recursively to the ids of relations held in the struct so that the entire object graph is reconstituted. This recursive process may be performed immediately, or may be done lazily as user traverses relations.
(5) Return the constructed instance.

In accordance with one embodiment, mutable objects are stored in the cache not as instances of their original classes, but as structs of immutable state, including immutable field values and the ids of related mutable values. Every such struct—and therefore every mutable object—can be identified by a unique id so that graphs can be reconstituted with references to the correct instances, including shared references within an object graph or across object graphs. Structs can be cached individually on their ids within the flat cache space for easy lookup. The mutable-handling decorator can hide these cache entries from the user. Reference counting can be used to determine when a struct is no longer referenced from any value graph and can be safely removed from the cache.

In accordance with one embodiment, constructing instances of user-defined classes and transferring their state to and from cached structs can be accomplished through hooks added to the class bytecode. Additional hooks can be employed to detect access to instance fields. This can allow the mutable-handling decorator to track dirty fields and to redirect state access to the transactional workspace when the instance is accessed in a transactional context. The required bytecode manipulation can be performed during the build process or dynamically on class load.

In accordance with one embodiment, the bytecode of standard mutable classes such as lists, maps, and dates may not be modified. Rather, subclasses (e.g. CacheableArrayList, CacheableHashMap) can be generated through bytecode as needed. These subclasses can exhibit the same dirty-tracking and state-intercepting behavior as modified user-defined types. Instances of standard mutable types present in object graphs can be replaced with instances of these subclasses on flush. Thus, a flush represents a boundary after which held references to standard mutable objects can become invalid. Note that this applies only to newly-cached standard mutables—instances retrieved from a cached object graph can always be instances of cacheable subclasses already.

In accordance with one embodiment, flushes can occur explicitly if the underlying cache is a session, on beforeCompletion within transactions, and on individual updates otherwise. A flush can perform the following steps:

(1) Calculate changes to reference counts based on the reassigning of relations within the session, transaction, or individual update.
(2) Replace references to newly-cached standard mutable types with cacheable subclass instances, as described above.
(3) Flush reference count changes along with outstanding dirty mutable state to the underlying workspace.
(4) If any struct reference count reaches zero, schedule the struct's entry for removal.
(5) The underlying session or transactional cache can handle the rest operations related to a specific cache.

In accordance with one embodiment, Java annotation can be used to allow users to identify their mutable object types. In addition, configuration file constructs can allow users to identify their mutable object types.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A computer-implemented method to support transactional caching service, comprising:
    associating a transactional decorator with a transactional cache, wherein the transactional decorator maintains a mapping between a plurality of transactions and a plurality of workspaces, and wherein each said workspace contains data used in a transaction of the plurality of transactions;
    receiving a request to perform one or more operations associated with a transaction of the plurality of transactions at the transactional decorator;
    using the mapping in the transactional decorator to find a workspace associated with the transaction; and
    applying the one or more operations associated with the transaction to the workspace associated with the transaction.

2. The method of claim 1, wherein:
    the transactional cache is configured using an isolation level.

3. The method of claim 1, further comprising:
    obtaining locks on data used in a transaction in the plurality of transactions based on a configured isolation level for the transaction, if the transaction is a pessimistic transaction.

4. The method of claim 1, further comprising:
    recording versions of data used in a transaction in the plurality of transactions, if the transaction is an optimistic transaction.

5. The method of claim 1, further comprising:
    initiating a transaction completion process when a user issues a commit or rollback, or when current transaction ends.

6. The method of claim 5, wherein:
    the transaction completion process uses synchronization call backs beforeCompletion and afterCompletion.

7. The method of claim 1, further comprising:
    grouping a set of cached objects to enable event processing, wherein cache actions are automatically performed on related objects in the set of cached objects.

8. The method of claim 1, further comprising:
    updating cache objects only at the end of a session.

9. The method of claim 1, further comprising:
    creating the transactional cache from a cache manager component.

10. The method of claim 1, further comprising:
    the transactional cache is capable of self loading.

11. The method of claim 1, wherein:
    the transactional cache uses a message transport component to communicate with one or more distributed caches that span over one or more virtual machine (VM) instances.

12. The method of claim 1, further comprising:
updating and/or querying a second cache in the transactional cache with respect to updating and/or querying of a first cache in the transactional cache via a forward strategy and/or a listening scheme.

13. A computer readable medium including instructions stored thereon, which when executed cause the computer to perform the steps of:
associating a transactional decorator with a transactional cache, wherein the transactional decorator maintains a mapping between a plurality of transactions and a plurality of workspaces, and wherein each said workspace contains data used in a transaction of the plurality of transactions;
receiving a request to perform one or more operations associated with a transaction of the plurality of transactions at the transactional decorator;
using the mapping in the transactional decorator to find a workspace associated with the transaction; and
applying the one or more operations associated with the transaction to the workspace associated with the transaction.

14. A computer-implemented system to support transactional caching service, comprising:
one or more microprocessors;
a transaction decorator which runs on the one or more microprocessors and is associated with a transaction cache, wherein the transaction decorator operates to perform the steps of
associating a transactional decorator with a transactional cache, wherein the transactional decorator maintains a mapping between a plurality of transactions and a plurality of workspaces, and wherein each said workspace contains data used in a transaction of the plurality of transactions;
receiving a request to perform one or more operations associated with a transaction of the plurality of transactions at the transactional decorator;
using the mapping in the transactional decorator to find a workspace associated with the transaction; and
applying the one or more operations associated with the transaction to the workspace associated with the transaction.

15. The method of claim 1, further comprising:
merging data in the workspace into the transactional cache upon the transaction is successfully committed.

* * * * *

UNITED STATES PATENT AND TRADEMARK OFFICE
CERTIFICATE OF CORRECTION

| | | |
|---|---|---|
| PATENT NO. | : 8,019,945 B2 | |
| APPLICATION NO. | : 12/363648 | |
| DATED | : September 13, 2011 | |
| INVENTOR(S) | : Revanuru | |

It is certified that error appears in the above-identified patent and that said Letters Patent is hereby corrected as shown below:

In column 8, line 21, delete "elapsed" and insert -- elapsed. --, therefor.

In column 10, line 43, delete "Distributed Cache" and insert the same on Line 44, Col. 10 as a sub heading.

In column 11, line 61, delete "210;" and insert -- 210. --, therefor.

In column 14, line 42, delete "vention," and insert -- of the present invention, --, therefor.

In column 23, line 31, delete "914d;" and insert -- 914d; and --, therefor.

Signed and Sealed this
Sixth Day of December, 2011

David J. Kappos
*Director of the United States Patent and Trademark Office*